United States Patent
Terada

(10) Patent No.: US 11,847,148 B2
(45) Date of Patent: Dec. 19, 2023

(54) INFORMATION PROCESSING DEVICE AND SETTING DEVICE

(71) Applicant: Schneider Electric Japan Holdings Ltd., Tokyo (JP)

(72) Inventor: Toru Terada, Osaka (JP)

(73) Assignee: SCHNEIDER ELECTRIC JAPAN HOLDINGS LTD., Tokyo (JP)

( * ) Notice: Subject to any disclaimer, the term of this patent is extended or adjusted under 35 U.S.C. 154(b) by 145 days.

(21) Appl. No.: 17/006,082

(22) Filed: Aug. 28, 2020

(65) Prior Publication Data

US 2021/0149938 A1    May 20, 2021

(30) Foreign Application Priority Data

Nov. 20, 2019 (JP) ................................. 2019-209871

(51) Int. Cl.
*G06F 16/21*      (2019.01)
*G06F 16/33*      (2019.01)
*G06F 3/0482*     (2013.01)
*G10L 15/08*      (2006.01)

(52) U.S. Cl.
CPC ........ *G06F 16/3334* (2019.01); *G06F 3/0482* (2013.01); *G10L 15/08* (2013.01); *G10L 2015/081* (2013.01)

(58) Field of Classification Search
CPC ..... G10L 15/08; G10L 15/00; G10L 15/1815; G06F 3/167; G06F 16/433; G06F 16/3329
USPC .......... 707/17.006, 17.124, 17.071, 694, 748
See application file for complete search history.

(56) References Cited

U.S. PATENT DOCUMENTS

| | | | | |
|---|---|---|---|---|
| 6,697,879 B1* | 2/2004 | Tufty | ..................... | G06Q 10/00 709/201 |
| 7,234,094 B2* | 6/2007 | Kadkade | ............. | G06F 11/3604 714/744 |
| 7,769,344 B1* | 8/2010 | Harvey | .............. | H04N 21/4432 455/39 |
| 8,589,271 B2* | 11/2013 | Evans | .................. | G06Q 20/386 705/38 |

(Continued)

FOREIGN PATENT DOCUMENTS

| | | | | |
|---|---|---|---|---|
| CN | 103892801 A | * | 7/2014 | ........... A61B 5/0002 |
| JP | 08-212242 | | 8/1996 | |

(Continued)

OTHER PUBLICATIONS

Office Action issued for JP Application No. 2019-209871 dated Mar. 22, 2023, with English translation, 5 pages.

*Primary Examiner* — Tony Mahmoudi
*Assistant Examiner* — Linh Black
(74) *Attorney, Agent, or Firm* — Nixon & Vanderhye, PC

(57) ABSTRACT

A control section includes: an identifying section configured to, by referring to one or more search keywords set for one or more control targets, identify at least one search keyword from among the one or more search keywords, the at least one search keyword matching any of one or more main words contained in input data acquired through voice input; and a selecting section configured to select at least one control target from among the one or more control targets based on one or more numeric values obtained through calculation of one or more expressions each of which batch-converts, into numerical form, one or more of the one or more search keywords set for the one or more control targets.

10 Claims, 7 Drawing Sheets

SS2

| | N1 | V1 | NA | CF3 | CF2 |
|---|---|---|---|---|---|
| | No | Variable | Name | Required word | Expression for conversion of preferred words into numerical form |
| #1 | | CoolerSetTemperature | Set temperature of cooler | Cooler | (temperature * 1 + set * 2) |
| #2 | | CoolerTemperature | Current temperature of cooler | Cooler | (temperature * 2 + current * 1) |
| #3 | | HeaterSetTemperature | Set temperature of heater | Heater | (temperature * 1 + set * 2) |
| #4 | | HeaterTemperature | Current temperature of heater | Heater | (temperature * 2 + current * 1) |

(56) References Cited

U.S. PATENT DOCUMENTS

| | | | |
|---|---|---|---|
| 9,190,054 B1 * | 11/2015 | Riley | G06F 40/232 |
| 9,558,265 B1 * | 1/2017 | Tacchi | G06F 16/338 |
| 9,710,544 B1 * | 7/2017 | Smith | G06F 16/36 |
| 10,089,965 B1 * | 10/2018 | Ward | G06F 3/04845 |
| 10,779,085 B1 * | 9/2020 | Carrigan | H04L 12/2816 |
| 2002/0174147 A1 * | 11/2002 | Wang | G06F 16/957 |
| | | | 707/E17.119 |
| 2004/0153992 A1 * | 8/2004 | Molina-Moreno | G06F 8/38 |
| | | | 717/109 |
| 2007/0072299 A1 * | 3/2007 | Orihashi | G01N 35/00 |
| | | | 436/43 |
| 2007/0239837 A1 * | 10/2007 | Jablokov | G10L 15/30 |
| | | | 704/E15.047 |
| 2008/0104571 A1 * | 5/2008 | Jaeger | G06F 3/0481 |
| | | | 717/113 |
| 2011/0182283 A1 * | 7/2011 | Van Buren | H04W 4/14 |
| | | | 704/270.1 |
| 2011/0302551 A1 * | 12/2011 | Hummel, Jr. | G06F 8/45 |
| | | | 717/107 |
| 2012/0166372 A1 * | 6/2012 | Ilyas | G06N 7/01 |
| | | | 706/14 |
| 2012/0166373 A1 * | 6/2012 | Sweeney | G06N 7/01 |
| | | | 706/14 |
| 2014/0025660 A1 * | 1/2014 | Mohammed | G06Q 30/0241 |
| | | | 707/722 |
| 2014/0180798 A1 * | 6/2014 | Bailey | G06Q 30/0277 |
| | | | 705/14.45 |
| 2015/0135206 A1 * | 5/2015 | Reisman | H04H 20/93 |
| | | | 725/18 |
| 2015/0142448 A1 | 5/2015 | Tsujino | |
| 2015/0363478 A1 * | 12/2015 | Haynes | G06Q 10/06 |
| | | | 707/610 |
| 2016/0006854 A1 | 1/2016 | Aizawa et al. | |
| 2016/0048274 A1 * | 2/2016 | Rosenberg | G06F 3/04847 |
| | | | 715/753 |
| 2016/0133246 A1 * | 5/2016 | Ogasawara | G10H 7/02 |
| | | | 704/260 |
| 2017/0068986 A1 * | 3/2017 | Chan | G06Q 30/0245 |
| 2017/0230472 A1 * | 8/2017 | Hasegawa | H04L 67/01 |
| 2017/0315849 A1 * | 11/2017 | Salas | G06F 9/451 |
| 2017/0328733 A1 * | 11/2017 | Gotoh | G01C 21/367 |
| 2018/0222056 A1 * | 8/2018 | Suzuki | B25J 9/0096 |
| 2020/0107891 A1 * | 4/2020 | Ohashi | B25J 9/1697 |
| 2020/0118548 A1 * | 4/2020 | Huang | G10L 15/1815 |

FOREIGN PATENT DOCUMENTS

| | | | | |
|---|---|---|---|---|
| JP | 2004038867 A | * | 2/2004 | |
| JP | 4221838 B2 | * | 2/2009 | A63F 13/005 |
| JP | 2014-002586 | | 1/2014 | |
| JP | 2016-019070 | | 2/2016 | |
| JP | 2017-215671 | | 12/2017 | |
| JP | 2018-180030 | | 11/2018 | |

* cited by examiner

FIG. 4

| No N1 | Variable V1 | Name NA | Expression for conversion of required words into numerical form CF1 | Expression for conversion of preferred words into numerical form CF2 |
|---|---|---|---|---|
| #1 | MaterialTankLevel | Current fill level of material tank MA | (tank & (source material \| raw material)) | (remaining \| level \| current fill level \| quantity) |
| #2 | TankTemperature | Set temperature of tank A1 | (tank & A1) | (temperature & set) |
| #3 | TankSetTemperature | Current temperature of tank A1 | (tank & A1) | (temperature + current) |
| #4 | TankLevel | Level of tank A1 | (tank & A1) | (remaining \| level \| current fill level \| quantity) |

| No N1 | Variable V1 | Name NA | Required word CF3 | Expression for conversion of preferred words into numerical form CF2 |
|---|---|---|---|---|
| #1 | CoolerSetTemperature | Set temperature of cooler | Cooler | (temperature * 1 + set * 2) |
| #2 | CoolerTemperature | Current temperature of cooler | Cooler | (temperature * 2 + current * 1) |
| #3 | HeaterSetTemperature | Set temperature of heater | Heater | (temperature * 1 + set * 2) |
| #4 | HeaterTemperature | Current temperature of heater | Heater | (temperature * 2 + current * 1) |

SS2

INFORMATION PROCESSING DEVICE AND SETTING DEVICE

This Nonprovisional application claims priority under 35 U.S.C. § 119 on Patent Application No. 2019-209871 filed in Japan on Nov. 20, 2019, the entire contents of which are hereby incorporated by reference.

TECHNICAL FIELD

The present invention relates to an information processing device and a setting device.

BACKGROUND ART

A technique to search for a control target through voice input has been known as a conventional technique. For example, Patent Literature 1 discloses an information processing device which: assigns weights to a first voice, which is a voice of a user, and a second voice, which is a voice of a person over the phone, respectively; and determines, in accordance with the values of the weights, which of the first and second voices should be given higher priority.

CITATION LIST

Patent Literature

[Patent Literature 1]
Japanese Patent Application Publication Tokukai No. 2016-19070 (Publication date: Feb. 1, 2016)

SUMMARY OF INVENTION

Technical Problem

The information processing device disclosed in Patent Literature 1 merely assigns weights to the first voice and the second voice, respectively, and therefore it is difficult to carry out the search in a manner such that applications having similar keywords are distinguished from each other. Therefore, the information processing device is incapable of sufficiently improving the accuracy of selection of an application. An object of an aspect of the present invention is to improve the accuracy of selection of a control target.

Solution to Problem

In order to attain the above object, an information processing device in accordance with an aspect of the present invention includes: an identifying section configured to, by referring to one or more search keywords set for one or more control targets, identify at least one search keyword from among the one or more search keywords, the at least one search keyword matching any of one or more main words contained in input data acquired through voice input; and a selecting section configured such that: the at least one search keyword identified by the identifying section is referred to; and thereby the selecting section selects at least one control target from among the one or more control targets based on one or more numeric values obtained through calculation of one or more expressions each of which batch-converts, into numerical form, one or more of the one or more search keywords set for the one or more control targets.

Advantageous Effects of Invention

An aspect of the present invention makes it possible to improve the accuracy of selection of a control target.

BRIEF DESCRIPTION OF DRAWINGS

FIG. 4 shows a settings screen which is displayed on the display included in the PC of FIG. 1 and on which search conditions are set.

FIG. 7 shows search conditions stored in a user memory of a programmable display device in accordance with Embodiment 2 of the present invention.

DESCRIPTION OF EMBODIMENTS

Embodiment 1

Figure 1:
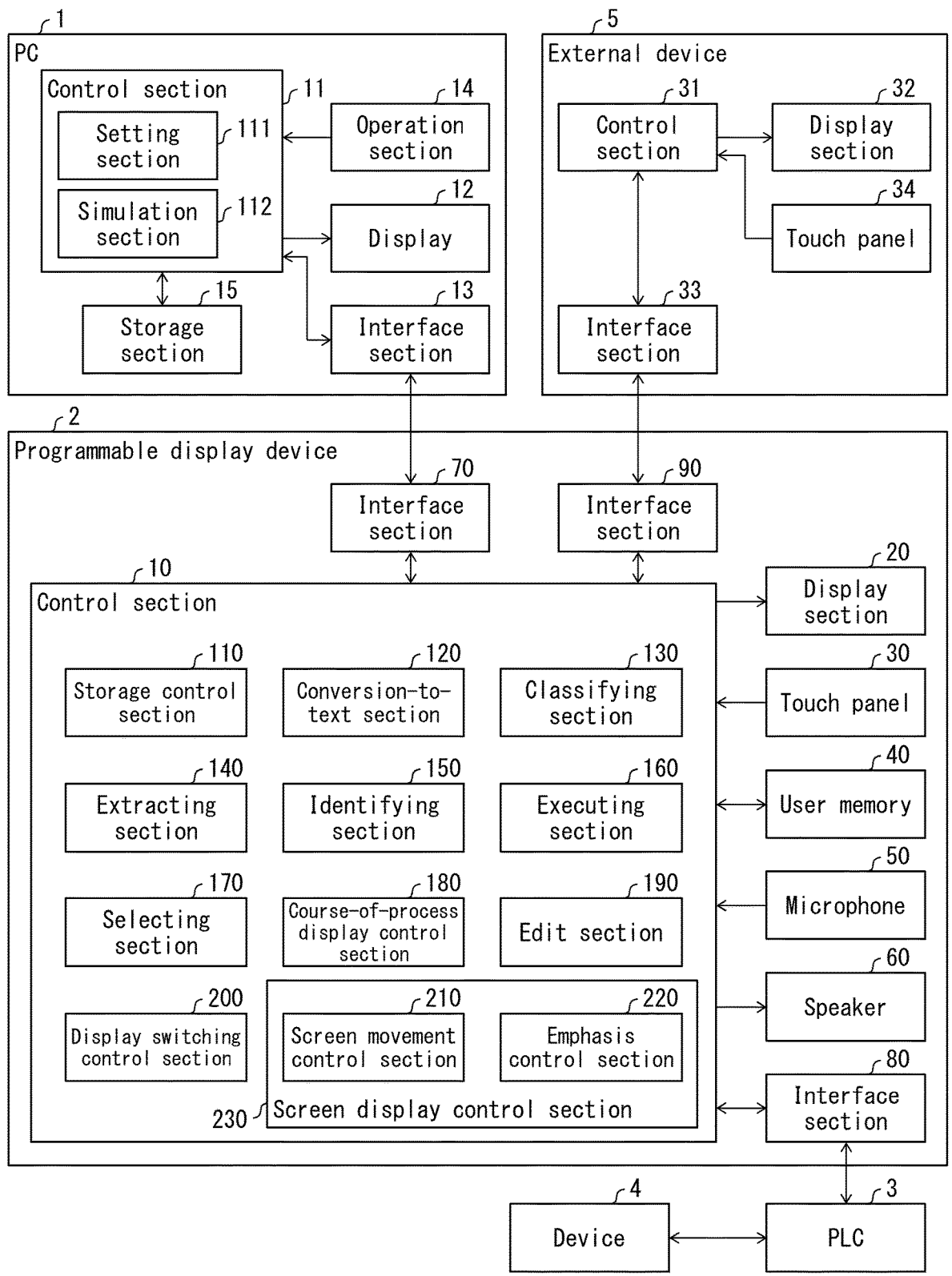
FIG. 1 is a block diagram illustrating configurations of a PC, a programmable display device, and an external device, in accordance with Embodiment 1 of the present invention.

The following description will discuss, with reference to FIG. 1, configurations of a personal computer (hereinafter referred to as "PC" for short) 1 (setting device), a programmable display device 2 (information processing device), and an external device 5. FIG. 1 is a block diagram illustrating the configurations of the PC 1, the programmable display device 2, and the external device 5, in accordance with Embodiment 1 of the present invention.

(Configuration of PC 1)

As illustrated in FIG. 1, the PC 1 includes a control section 11, a display 12, an interface section 13, an operation section 14, and a storage section 15. The PC 1 is connected to the programmable display device 2. The PC 1 functions as a screen creating device that executes a program for screen editing and thereby creates a graphics screen that is to be displayed by the programmable display device 2.

The control section 11 controls each section of the PC 1. The control section 11 includes a setting section 111 and a simulation section 112. The control section 11 carries out control related to display by the display 12, and carries out control related to communications between the PC 1 and the programmable display device 2 through the interface section 13. The display 12 is a monitor that displays the results of processing by the PC 1. The interface section 13 is a communication section through which the PC 1 communicates with the programmable display device 2, and is configured to communicate with a control section 10 of the programmable display device 2. The operation section 14 is, for example, a keyboard through which a user inputs data or a mouse operated by a user. The storage section 15 stores the results of processing by the PC 1.

(Processing by PC 1)

Figure 3:
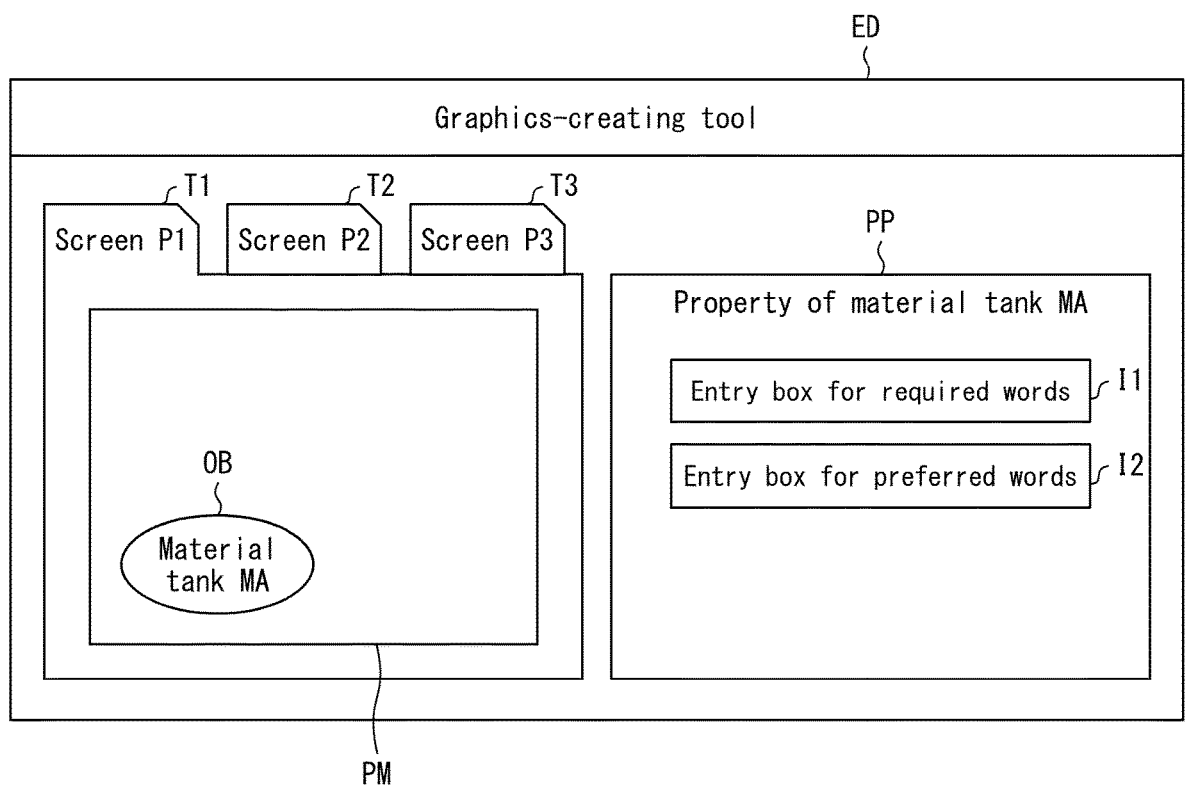
FIG. 3 illustrates an edit screen for screen editing, which is displayed by a display included in the PC of FIG. 1.

The control section 11 of the PC 1 executes a screen editing program, as the program for screen editing. Upon execution of the screen editing program by the control section 11, as illustrated in FIG. 3, the display 12 displays thereon an edit screen ED for screen editing. FIG. 3 illustrates the edit screen ED for screen editing, which is displayed by the display 12 included in the PC 1 of FIG. 1. The edit screen illustrated in FIG. 3 is an example. The edit screen ED contains screen selection tabs T1, T2, and T3, a graphics screen PM, and a property PP. The edit screen ED is an edit screen in a graphics-creating tool for creating graphics screens. The graphics-creating tool is software that is a bundle of various kinds of screen editing functions realized by execution of the screen editing program, which are bundled for user convenience.

User operations of the edit screen ED described here can be carried out through the operation section 14. The setting section 111 stores, in the storage section 15, settings made on the edit screen ED. When the user makes a click on the screen selection tab T1, a graphics screen PM for a screen P1 is displayed in the left part of the edit screen ED. Similarly, when the user makes a click on the screen selection tab T2 or T3, a graphics screen for a screen P2 or P3 is displayed in the left part of the edit screen ED. The user can place, on the graphics screen PM, an object OB representing a material tank MA which is a control target. The user can place one or more objects of one or more control targets on the graphics screen PM.

When the user makes a click on the object OB, the property PP of the material tank MA is displayed in the right part of the edit screen ED. The property PP contains entry boxes I1 and I2. The user can enter one or more required words, as search keywords, in the entry box I1, and can enter one or more preferred words, as search keywords, in the entry box I2, during execution of a runtime program. Note that the entry of preferred words in the entry box I2 is not essential, and the entry box I2 may be left blank. Furthermore, the property PP may contain, instead of the entry boxes I1 and I2, boxes in which a list of required words (candidates) and a list of preferred words (candidates) are displayed.

Also with regard to entry boxes corresponding to the objects of the other control targets, required words and preferred words can be entered. As such, one or more search keywords are set for one or more control targets, and the search keywords are classified into required words and preferred words. For the purpose of addressing the following cases, search keywords may be placed between predetermined marks such as quotation marks. Such cases are, specifically, cases where a single control target is represented by two or more words in English or the like, cases where there is a need to distinguish between a number as a search keyword and a numeric value indicative of the result of calculation of an expression concerning search keywords, and the like cases.

Furthermore, when the user makes a right-click on an area other than the object OB on the graphics screen PM, a property (not illustrated) of the graphics screen PM is displayed in the right part of the edit screen ED. The property contains: an entry box where the name of a screen or a screen number can be entered; and an entry box where a single required word can be entered.

In response to user operation of the operation section 14, the control section 11 switches the edit screen ED to a settings screen SS on which search conditions shown in FIG. 4 are set. FIG. 4 shows the settings screen SS, which is displayed on the display 12 included in the PC 1 of FIG. 1 and on which search conditions are set. The settings screen SS contains a number display column N1, a variable entry column V1, a name entry column NA, and entry columns CF1 and CF2.

User operations of the settings screen SS described here can be carried out through the operation section 14. The setting section 111 stores, in the storage section 15, settings made on the settings screen SS. The number display column N1 contains numbers for respective control targets. The user can enter variables in the variable entry column V1 on a per-control target basis. Each of the variables here is the one based on which the control section 10 of the programmable display device 2 identifies a corresponding control target. More specifically, the variable is associated with the address of an internal memory of the PLC 3 or with the address of an internal memory of the programmable display device 2, and is information in the form that is easily understandable to the user, such as a character string representing a control target.

Similarly, the user can enter the names of control targets in the name entry column NA. Each of the names here is for the user to easily identify a corresponding control target. The variables are associated with the object OB; therefore, on the settings screen SS, the name of the object OB corresponding to the variables may be displayed.

The user can enter expressions for conversion of required words into numerical form in the entry column CF1, and can enter expressions for conversion of preferred words into numerical form in the entry column CF2. The user can enter, as an expression for conversion of required words into numerical form, for example, the expression "(tank & (source material|raw material))" in one of the cells of the entry column CF1 corresponding to the current fill level of the material tank MA. The user can use, as required words, the words "tank", "source material", and "raw material" entered in the entry box I1, and can prepare expressions using such required words.

The user can enter, as an expression for conversion of preferred words into numerical form, for example, the expression "(remaining|level|current fill level|quantity)" in one of the cells of the entry column CF2 corresponding to the current fill level of the material tank MA. The user can use, as preferred words, the words "remaining", "level", "current fill level", and "quantity" entered in the entry box I2, and can prepare expressions using such preferred words.

Note that the following arrangement may be employed: an expression for conversion of required words into numerical form can be entered directly in the entry box I1; and an expression for conversion of preferred words into numerical form can be entered directly in the entry box I2. Alternatively, the following arrangement may be employed: an expression for conversion of required words into numerical form and an expression for conversion of preferred words into numerical form can be entered directly in the entry columns CF1 and CF2, respectively, without entering required words and preferred words in the entry boxes I1 and I2, respectively. Also in such cases, search keywords are classified into required words and preferred words.

The property PP does not need to contain the entry box I2. In a case where the property PP does not contain the entry box I2, the entry box I1 of the property PP may be arranged such that either (i) a required word(s) or (ii) an expression(s) for conversion of required words into numerical form is/are entered in the entry box I1. Also with regard to the entry columns CF1 and CF2, the settings screen SS does not need to contain the entry column CF2. In a case where, of the edit screen ED and the settings screen SS, only the edit screen ED is used for settings, the property PP may contain entry boxes in which variables and names can be entered.

As has been described, in accordance with the user input operation through the operation section 14, the setting section 111 sets, for one or more control targets, a search keyword(s) and an expression(s) for conversion of search keywords into numerical form. According to this configuration, the user can easily set, through the PC 1, a search keyword(s) and an expression(s) for one or more targets. This makes it possible for the user to easily achieve an improvement in accuracy of selection of a control target(s).

(Simulation)

Assume a situation in which settings have been done on the edit screen ED and/or the settings screen SS of the screen editing program. In this situation, a user can run a simulation to see which control target is selected in response to a certain sentence, by entering the sentence into the PC 1 through, for example, voice input by speech or text input. The simulation is carried out in a simulation manner by the simulation section 112. The course of the simulation carried out by the simulation section 112 is displayed on the display 12. The user can select how to carry out an actual operation of a control target, how to display the manner in which search keywords are selected, and the like.

The simulation is carried out to check whether or not processes after the speech are carried out properly. For example, in the simulation, when the user enters the sentence "What is the temperature of the tank?", the simulation section 112 extracts the main words "tank" and "temperature" from user input data which is the sentence entered by the user.

The simulation section 112 causes the display 12 to display at least one of (i) the course of a process in which a search keyword(s) is/are identified in a simulation manner and (ii) the course of a process in which a control target(s) is/are selected in a simulation manner. Specifically, the simulation section 112 causes the display 12 to display the course of a process in which: the search keyword(s) set by the setting section 111 for the control target(s) is/are referred to; and thereby a search keyword(s) matching any of the extracted main word(s) is/are identified in a simulation manner. The simulation section 112 causes the display 12 to display the course of a process in which a control target(s) is/are selected in a simulation manner based on a numeric value(s) obtained through calculation of an expression(s) for conversion, into numerical form, of the search keyword(s) set by the setting section 111 for the control target(s).

According to the above configuration, the user can pre-check, through the PC 1, whether or not a process to select a control target(s) is carried out properly on the programmable display device 2. Furthermore, since the identifying process and selecting process are displayed in a simulation manner on the PC 1 before the search keyword(s) and expression(s) are transmitted to the control section 10, the user can easily check whether or not a process to select a control target(s) is carried out properly.

Moreover, since the simulation demonstrates the course through to the selection of a control target(s) based on the result(s) of calculation of the expression(s), the user can check whether the selected result is correct or not. It will cost a lot of time and effort to check many control targets on-site in a debug mode (described later) of the programmable display device 2. The simulation presents, before carrying out the debug mode, the process carried out in the programmable display device 2 in a simulation manner as far as possible.

(Configuration of External Device 5)

As illustrated in FIG. 1, the external device 5 includes a control section 31, a display section 32, an interface section 33, and a touch panel 34. The external device 5 is, for example, a mobile terminal that is configured to communicate with the programmable display device 2. The control section 31 controls each section of the external device 5. The control section 31 identifies a control action from operation on the touch panel 34. The control section 31 carries out control related to display by the display section 32, and carries out control related to communications between the external device 5 and the programmable display device 2 through the interface section 33. The interface section 33 is a communication section through which the external device 5 communicates with the programmable display device 2.

(Configuration of Programmable Display Device 2)

As illustrated in FIG. 1, the programmable display device 2 includes a control section 10, a display section 20, a touch panel 30, a user memory 40, a microphone 50, a speaker 60, and interface sections 70, 80, and 90. The programmable display device 2 is connected to a programmable logic controller (PLC) 3.

The programmable display device 2 is connected to the PLC 3 through a communication cable, and thereby communicates with the PLC 3. The programmable display device 2 is a dedicated computer which displays a graphics screen for operation and display and thereby realizes the operation function and display function specific to the programmable display device. The programmable display device 2 is used as a human machine interface (HMI).

The control section 10 identifies the action of displaying the status of a device 4 connected to the PLC 3, the action of controlling the status of the device 4 in accordance with the operation on the touch panel 30, and the like. The control section 10 controls each section of the programmable display device 2. The control section 10 includes a storage control section 110, a conversion-to-text section 120, a classifying section 130, an extracting section 140, an identifying section 150, an executing section 160, a selecting section 170, a course-of-process display control section 180, an edit section 190, a display switching control section 200, and a screen display control section 230. The screen display control section 230 includes a screen movement control section 210 and an emphasis control section 220. The details of processes carried out by respective sections in the control section 10 will be described later.

The display section 20 displays a graphics screen created by a user, the status of the device 4, and the like. The user memory 40 stores therein one or more graphics screens created by a user, in the form of a screen file made up of a collection (group) of one or more graphics screens relating to each other. Such a screen file is prepared by the control section 11 of the PC 1 and downloaded from the PC 1.

The microphone 50 is a part through which a voice issued by the user is inputted. The speaker 60 is a part through which a sound is outputted from the programmable display device 2. Note that the programmable display device 2 may contain an interface(s) alone instead of the microphone 50 and the speaker 60. If the programmable display device 2 contains an interface(s) alone, the microphone 50 and the speaker 60, which are external devices, are connected to the programmable display device 2 through the interface(s). The interface section 70 is a communication section through which the programmable display device 2 communicates with the PC 1. The interface section 80 is a communication section through which the programmable display device 2 communicates with the PLC 3. The interface section 90 is a communication section through which the programmable display device 2 communicates with the external device 5.

The PLC 3 is a control device which, in accordance with a sequential program prepared by a user, reads the status of the device 4 and provides a control instruction to the device 4 at predetermined scanning times. The device 4 may be controlled by the PLC 3 or may be configured to output detected values (e.g., a sensor). There are a plurality of such devices 4.

(Process Carried Out by Programmable Display Device 2)

Figure 2:
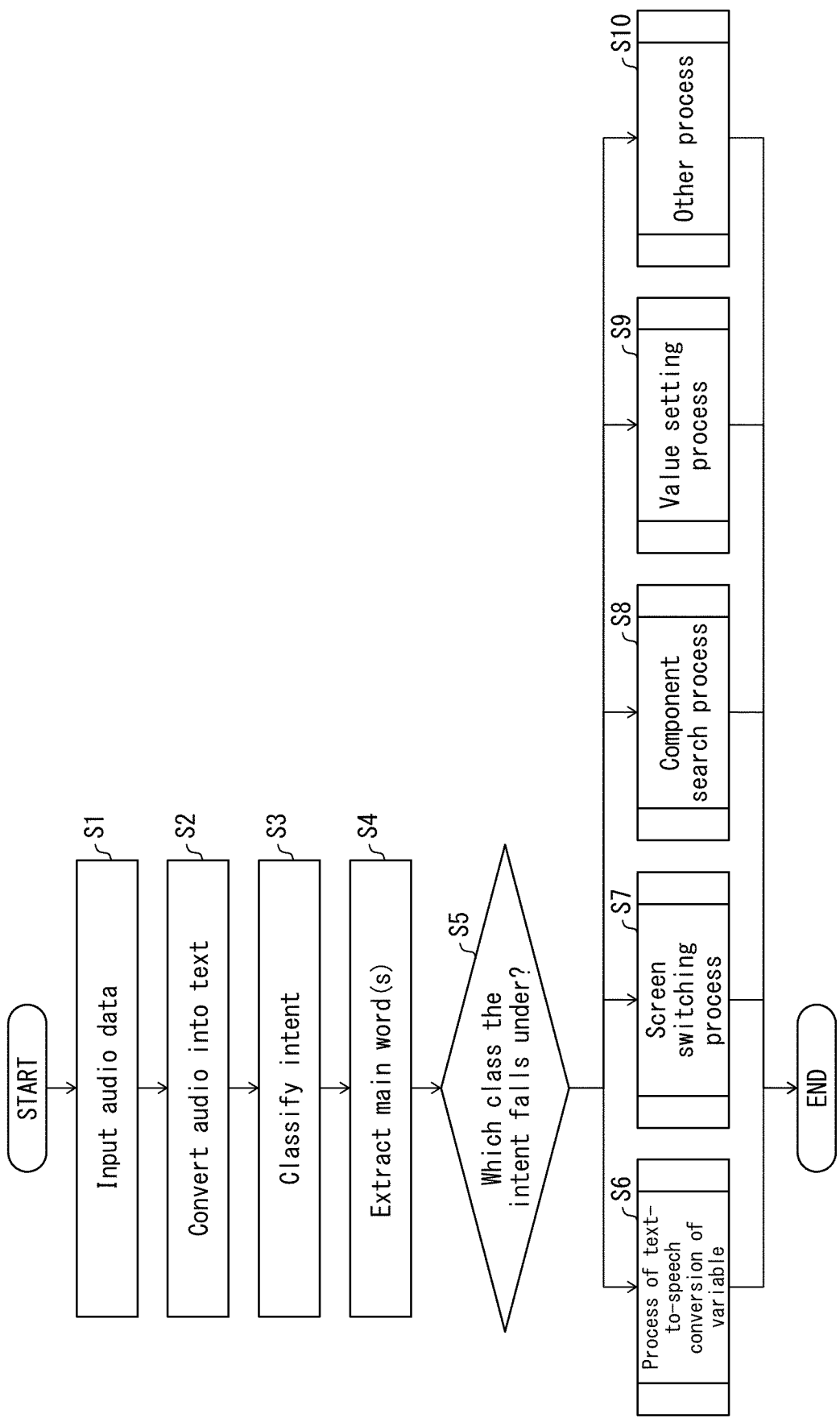
FIG. 2 is a flowchart showing steps of a process carried out by the programmable display device of FIG. 1.

The following description will discuss a process carried out by the programmable display device 2, with reference to FIG. 2. FIG. 2 is a flowchart showing steps of a process carried out by the programmable display device 2 of FIG. 1. As shown in FIG. 2, the storage control section 110 first causes the user memory 40 to store a search keyword(s) set for one or more control targets such as a screen(s), a variable(s), and/or a component(s), relating to information acquired by the programmable display device 2 from the PLC 3.

The control section 11 provides, to the interface section 13, settings information set on the edit screen ED and/or the settings screen SS of the screen editing program. The interface section 13 transmits, to the interface section 70, the settings information provided from the control section 11. The interface section 70 provides, to the control section 10, the settings information transmitted from the interface section 13. Specifically, the interface section 13 transmits, to the control section 10, a search keyword(s) set by the setting section 111 and an expression(s) to convert search keyword into numerical form. At least a portion of a process carried out by the control section 10, described later, may be carried out by a server which is communicably connected to the programmable display device 2.

The storage control section 110 stores the settings information in the user memory 40. The settings information contains the search keyword(s), and therefore this means that the storage control section 110 stores, in the user memory 40, the search keyword(s) set for one or more control targets. Note that the settings information may be copied from the PC 1 to the programmable display device 2 with use of a storage medium. As the storage medium, a memory card (universal serial bus (USB) memory or a secure digital (SD) card) may be used for the programmable display device 2.

The process in which the settings information is stored in the user memory 40 is completed before step S1 and subsequent steps are carried out by the programmable display device 2, and is not carried out while the programmable display device 2 is in operation. After the completion of the process in which the settings information is stored in the user memory 40, the settings information, which contains the search keyword(s) and expression(s), may be stored in the storage section 15 of the PC 1 or stored in the server.

The storage control section 110 may store the settings information in the PLC 3 so that the settings information can be easily edited by a person who made a program of the PLC 3 and that the settings information can be shared by, for example, a supervisory control and data acquisition (SCADA) which is used as a host human machine interface (HMI), while the programmable display device 2 is in operation. For example, the storage control section 110 may store the settings information in a memory included in the PLC 3.

In a case where the settings information is stored in the PLC 3, once the user carries out operation on the touch panel 34, the control section 31 provides, to the interface section 33, content of the user operation on the touch panel 34. The interface section 33 transmits the content of the operation to the interface section 90, and the interface section 90 provides the content of the operation to the control section 10. The edit section 190 causes content stored in the memory of the PLC 3 to reflect the received content of the operation, through the interface section 80.

Under the condition in which the settings information is stored in the user memory 40, a voice issued by the user is inputted through the microphone 50. The microphone 50 converts the voice into audio data, and provides the audio data to the control section 10. The control section 10 receives the audio data from the microphone 50 (S1).

The conversion-to-text section 120 converts the received audio data into input data in the form of text data (S2). The conversion by the conversion-to-text section 120 is carried out by a known method. The conversion-to-text section 120 provides, to the classifying section 130, the input data acquired through voice input. The classifying section 130, in accordance with preset conditions, classifies the intent of speech based on the input data (S3).

The classifying section 130 may be configured to, with use of a neural network included in the control section 10, classify the intent of speech based on the input data. Specifically, the classifying section 130 receives input data, extracts characteristics from the input data, and inputs the characteristics to the neural network. The neural network classifies the intent of speech based on the inputted characteristics. The classifying section 130 generates the intent of speech classified by the neural network.

After the classifying section 130 has classified the intent of speech, the extracting section 140 extracts one or more main words from the input data (S4). Note that the extracting section 140 may extract one or more main words obtained together with the intent of speech classified by the classifying section 130, or may extract, from the entire text of the input data, only one or more main words that match a search keyword(s) set for one or more control targets.

The control section 10 determines which of a plurality of intent classes programmed in the control section 10 the class of the intent classified by the classifying section 130 falls under (S5). In step S5, for example, in a case where the class of the intent classified by the classifying section 130 is text-to-speech conversion of variable, the control section 10 carries out a process of text-to-speech conversion of variable (S6).

In a case where, in step S5, the class of the intent classified by the classifying section 130 is screen switching, the control section 10 carries out a screen switching process (S7). Similarly, in a case where, in step S5, the class of the intent classified by the classifying section 130 is component search, value setting, or some other class, the control section 10 carries out a component search process, value setting process, or some other process (S8 to S10), respectively. Such other process is different from any of processes of S6 to S9.

(Process of Text-to-Speech Conversion of Variable)

Figure 5:
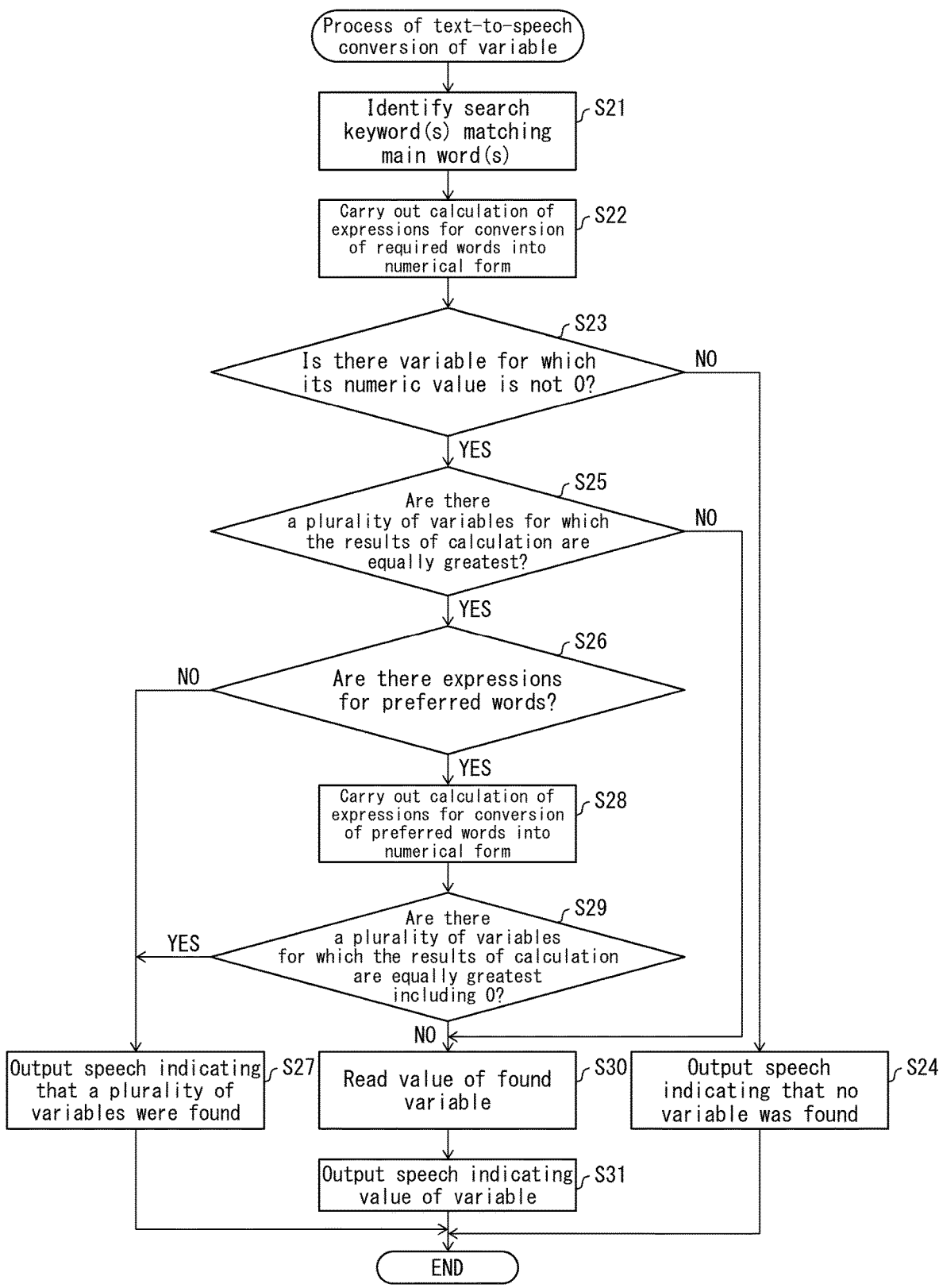
FIG. 5 is a flowchart showing a flow of the process of text-to-speech conversion of variable carried out by a control section included in the programmable display device of FIG. 1.

The following description discusses, with reference to FIGS. 4 and 5, the process of text-to-speech conversion of variable (step S6) carried out by the control section 10. FIG. 5 is a flowchart showing a flow of the process of text-to-speech conversion of variable carried out by the control section 10 included in the programmable display device 2 of FIG. 1. The user memory 40 stores therein settings information made on the settings screen SS illustrated in FIG. 4. First, as shown in FIG. 5, the identifying section 150 identifies a search keyword(s) matching any of the one or more main words extracted by the extracting section 140 (S21).

For example, in a case where the user says "What is the current fill level of the tank A1?", the extracting section 140 extracts the words "tank", "A1" and "current fill level" as main words. The identifying section 150 refers to, for example, the search keyword(s) contained in the settings information which has been stored in the user memory 40 by the storage control section 110. With this, the identifying section 150 identifies, on the settings screen SS, "tank", "A1" and "current fill level" as search keywords that match the main words. In this way, the identifying section 150 refers to the search keyword(s) set by the user, in order to identify at least one search keyword matching any of the main words from among the search keyword(s).

Specifically, the identifying section 150 refers to a required word(s) and a preferred word(s) contained in the settings information from the user memory 40. With this, the identifying section 150 identifies a required word(s) matching one or more main words, and identifies a preferred word(s) matching one or more main words. Specifically, the identifying section 150 identifies "tank" and "A1" as required words that match main words, and identifies "current fill level" as a preferred word that matches a main word.

The executing section 160 carries out calculation of an expression(s) for batch conversion of one or more search keywords set for a control target(s) into numerical form, by referring to the "tank", "A1", and "current fill level" identified by the identifying section 150. Specifically, the executing section 160 first carries out calculation of an expression(s) for conversion of required words into numerical form, in order to narrow down a list of candidate variables (S22). Note here that, in the expressions, each search keyword identified by the identifying section 150 is converted to 1, and each search keyword not identified by the identifying section 150 is converted to 0. The operator "&" in the expressions is indicative of the logical operator AND, the operator "|" in the expressions is indicative of the logical operator OR. The same conditions also apply to expressions for conversion of preferred words into numerical form.

With regard to step S22, for the name "current fill level of material tank MA", the expression (tank & (source material|raw material)) evaluates to (1 & (0|0))=0. For the name "set temperature of tank A1", the expression (tank & A1) evaluates to (1 & 1)=1. Also for the name "current temperature of tank A1" and the name "level of tank A1", the result is also 1. As such, narrowing down of the list of candidate variables using required words is carried out prior to narrowing down the list of candidate variables using preferred words. This makes it possible to reduce processing load for searching.

Next, the executing section 160 determines whether or not there is a variable for which the numeric value of the result of calculation of its corresponding expression for conversion of required words into numerical form is not 0 (S23). If there is no variable for which the numeric value of the result of calculation of its corresponding expression is not 0 (NO in S23), the executing section 160 carries out a text-to-speech conversion process in which the executing section 160 generates an audio signal indicative of speech indicating that no variable was found, provides the audio signal to the speaker 60, and causes the speaker 60 to output the signal in the form of a sound (S24).

If there is a variable for which the numeric value of the result of calculation of its corresponding expression for conversion of required words into numerical form is not 0 (YES in S23), the executing section 160 determines whether or not there are a plurality of variables for which the results of calculation of their corresponding expressions for conversion of required words into numerical form are equally greatest (S25). If the number of variables for which the results of calculation are equally greatest is not plural (NO in S25), the process proceeds to step S30 (described later).

If there are a plurality of variables for which the results of calculation of their corresponding expressions for conversion of required words into numerical form are equally greatest (YES in S25), the executing section 160 determines whether or not there is/are an expression(s) for conversion of preferred words into numerical form (S26). If there are no expressions for conversion of preferred words into numerical form (NO in S26), the selecting section 170 selects the plurality of variables, for which the results of calculation of their corresponding expressions for conversion of required words into numeric form are equally greatest, as control targets. The executing section 160 carries out a text-to-speech conversion process in which the executing section 160 generates an audio signal indicative of speech indicating that a plurality of variables were found, provides the audio signal to the speaker 60, and causes the speaker 60 to output the signal in the form of a sound (S27).

In this process, the executing section 160 may carry out a text-to-speech conversion process with regard to the value of each variable. Also note that, in step S27, the control section 10 may control the display section 20 to display the found variables so that the user can select which variable's value the user wishes to convert into speech.

In a case where there is/are an expression(s) for conversion of preferred words into numerical form (YES in S26), the executing section 160 carries out calculation of the expression(s) for conversion of preferred words into numerical form with regard to the variables for which the results of calculation of their corresponding expressions for conversion of required words into numerical form are equally greatest (S28). With regard to step S28, for the name "set temperature of tank A1", the expression (temperature & set) evaluates to (0 & 0)=0. For the name "current temperature of tank A1", the expression (temperature+current) evaluates to (0+0)=0. For the name "level of tank A1", the expression (remaining|level|current fill level|quantity) evaluates to (0|0|1|0)=1.

The selecting section 170 determines whether or not there are a plurality of variables for which the results of calculation of their corresponding expressions for conversion of preferred words into numerical form are equally greatest including 0 (S29). If there are a plurality of variables for which the results of calculation are equally greatest including 0 (YES in S29), the process proceeds to step S27.

In a case where the number of variables for which the results of calculation are equally greatest including 0 is not plural (NO is S29), the selecting section 170 selects the "level of tank A1", which is the variable for which the result of calculation is greatest, as a control target. As such, the selecting section 170 selects a control target based on the numeric values obtained through calculation of the expressions set by the user. Since search keywords and expressions can be set by the user, the user can make settings for searching using search keywords and expressions so that a control target(s) is/are appropriately selected.

The executing section 160 reads the value of the found variable (S30). Specifically, the executing section 160 carries out a text-to-speech conversion process in which the executing section 160 generates an audio signal indicative of speech indicating the value of "level of tank A1" which is the control target selected by the selecting section 170), provides the audio signal to the speaker 60, and causes the speaker 60 to output the signal in the form of a sound (S31). The unit for each variable may be set in the settings information so that the unit is also converted to speech together with the value of the variable when the text-to-speech conversion process is carried out.

As has been described, the selecting section 170 is configured such that: the search keyword(s) identified by the identifying section 150 is/are referred to; and thereby the selecting section 170 selects a control target(s) based on the numeric value(s) obtained through calculation of an expression(s) for batch conversion of one or more search keywords set for the control target(s) into numerical form. Specifically, the selecting section 170 selects a control target(s) based on the following numeric values: the numeric value(s) obtained through calculation of an expression(s) for batch conversion of one or more required words set for the control target(s) into numerical form; and the numeric value(s) obtained through calculation of an expression(s) for batch conversion of one or more preferred words set for the control target(s) into numerical form.

Required words are words set for one or more control targets and are necessarily referred to in order to select a control target(s). Preferred words are words set for one or more control targets and are referred to, with highest priority except the required words, in order to select a control target(s).

According to the configuration of the control section 10, a user can easily carry out a search to select a control target(s) through voice input. The control section 10 selects a control target(s) based on the numeric value(s) obtained by conversion of a search keyword(s) into numerical form; therefore, it is possible to improve the accuracy of selection of a control target(s).

The user can also easily make settings for a search to select a control target(s), because the user only needs to set a search keyword(s) and an expression(s) for one or more control targets. Furthermore, the user can easily change the settings for a search to select a control target(s) so that, even if the user does not remember the correct name of a control target, the control target is more appropriately selected. The control section 10 is capable of carrying out search processes corresponding to various search keywords set by the user.

In the flowcharts shown in FIGS. 2 and 5, in a case of YES in step S26, the selecting section 170 selects a control target(s) in the following manner. Specifically, the selecting section 170 selects a control target(s) based on (i) a numeric value(s) (first numeric value(s)) obtained through calculation of an expression(s) for batch conversion of required words into numerical form and (ii) a numeric value(s) (second numeric value(s)) obtained through calculation of an expression(s) for batch conversion of preferred words into numerical form.

Note, however, that preferred words do not necessarily need to be entered. Therefore, in a case of NO in step S25 or in a case of NO in step S26, if no preferred words are entered, the selecting section 170 selects a control target(s) based on the first numeric value(s) without using the second numeric value(s).

(Debug Mode)

The following arrangement may be employed: a normal mode, in which a graphics screen is displayed on the display section 20 or on the display section 32 of the external device 5 by the programmable display device 2, the external device 5, or the like, can transition to a debug mode. The control section 10 transitions from the normal mode to the debug mode in response to user operation. With regard to the debug mode, the user can set whether an action the user wants a control target to carry out is carried out or not.

In the debug mode, the course-of-process display control section 180 controls the display section 20 of the programmable display device 2 to display at least one of (i) the course of a process in which the identifying section 150 identifies a search keyword(s) matching a main word(s) and (ii) the course of a process in which the selecting section 170 selects a control target(s) based on a numeric value(s) obtained through the foregoing calculation. The course-of-process display control section 180 also controls the display section 20 to display, during the course of the process in which the control target(s) is/are selected, the expression(s) for conversion of search keywords into numerical form. Note that the course-of-process display control section 180 may control the display section 32 of the external device 5 so that the course of the process and the expression(s) are displayed on the display section 32.

According to the above configuration, the user can check the course of the process in which a search keyword(s) is/are identified and the course of the process in which a control target(s) is/are selected, on the display section 20 of the programmable display device 2 and/or on the display section 32 of the external device 5. This allows the user to check whether settings are made so that intended actions will be carried out.

Note that, in a case where the control section 10 carries out a process of controlling the display section 32 of the external device 5 to carry out display, the control section 10 provides the processed content to the interface section 90, and the interface section 90 transmits the processed content to the interface section 33. The interface section 33 provides the processed content to the control section 31, and the control section 31 carries out a process of controlling the display section 32 to carry out display in accordance with the processed content.

Furthermore, in the debug mode, the edit section 190 edits the search keyword(s) and expression(s) displayed on the display section 20 and/or on the display section 32 of the external device 5, in response to user operation. Specifically, upon the user operation to the touch panel 30, the edit section 190 edits the search keyword(s) and expression(s) in accordance with the user operation.

The user can edit the search keyword(s) and expression(s) by operating the external device 5 and thereby proving an instruction to the edit section 190 of the programmable display device 2. Alternatively, the user can download the search keyword(s) and expression(s) at a time from the programmable display device 2 and edit them on the touch panel 34 of the external device 5, in order to improve the efficiency of editing work. In this case, the user uploads, to the programmable display device 2, the search keyword(s) and expression(s) edited on the touch panel 34.

The edit section 190 overwrites the search keyword(s) and expression(s) stored in the user memory 40 with the edited search keyword(s) and expression(s). This configuration makes it possible for the user to edit a search keyword(s) and expression(s) displayed on the display section 20 or on the display section 32 of the external device 5 so that a more appropriate control target(s) is/are selected.

In a case where editing work is carried out on the programmable display device 2, if a screen for editing is superimposed on the original screen displayed on the display section 20, the original screen becomes difficult to see. To address this, by carrying out editing on the touch panel 34 of the external device 5, the screen for editing is not displayed on the display section 20, and therefore it is possible to avoid the inconvenience that the original screen is difficult to see. In addition, the external device 5 includes an application program suitable for editing search keywords and expressions. This makes it possible to carry out editing more efficiently than editing on the programmable display device 2.

Furthermore, the following process may be carried out in order to indicate, to the user, in what way the content of speech was interpreted or in what manner the list of candidate control targets was narrowed down. Specifically, history of speeches converted into the form of text data, search results, and a list of ordered search results may be displayed on the display section 20 or on the display section 32 of the external device 5, or may be stored in the user memory 40 or a memory (not illustrated) of the external device 5.

(Screen Switching Process)

The following description discusses step S7, i.e., the screen switching process, which is carried out by the control section 10. The screen switching process (step S7) is different from the process of text-to-speech conversion of variable (step S6) in that the selecting section 170 selects a graphics screen as a control target instead of selecting a variable as a control target. The screen switching process (step S7) is different from the process of text-to-speech conversion of variable (step S6) also in that the display switching control section 200 carries out the screen switching process instead of the executing section 160 carrying out the process of text-to-speech conversion of the value(s) of a variable(s).

The display switching control section 200 switches a graphics screen created by a user from the currently displayed graphics screen to a graphics screen selected by the selecting section 170. In the screen switching process, the control section 10 may identify a to-be-displayed screen with use of the screen number or the name of the screen as a required word, without using expressions.

(Component Search Process)

The following description discusses step S8, i.e., the component search process, which is carried out by the control section 10. The component search process (step S8) is different from the process of text-to-speech conversion of variable (step S6) in that the selecting section 170 selects a component (object OB) as a control target instead of selecting a variable as a control target. The component search process (step S8) is different from the process of text-to-speech conversion of variable (step S6) also in that the display switching control section 200 carries out the screen switching process instead of the executing section 160 carrying out the process of text-to-speech conversion of the value(s) of a variable(s).

The display switching control section 200 switches a graphics screen created by a user from (i) a graphics screen is which a component(s) as a control target(s) selected by the selecting section 170 is/are not displayed to (ii) a graphics screen in which a component(s) as a control target(s) selected by the selecting section 170 is/are displayed. According to this configuration, a graphics screen in which a selected control target(s) is/are not displayed is switched to a graphics screen in which a selected control target(s) is/are displayed. This makes it possible for the user to instantly check the selected control target(s).

Assume here that a graphics screen created by the user contains a component(s) as a control target(s) selected by the selecting section 170 and that graphics screen is higher in resolution than the display section 20 or the display section 32 of the external device 5 which displays the graphics screen. Assume that, in this case, the previously displayed graphics screen has been switched by the display switching control section 200 to the graphics screen in which the component(s) selected by the selecting section 170 is/are displayed.

Figure 6:
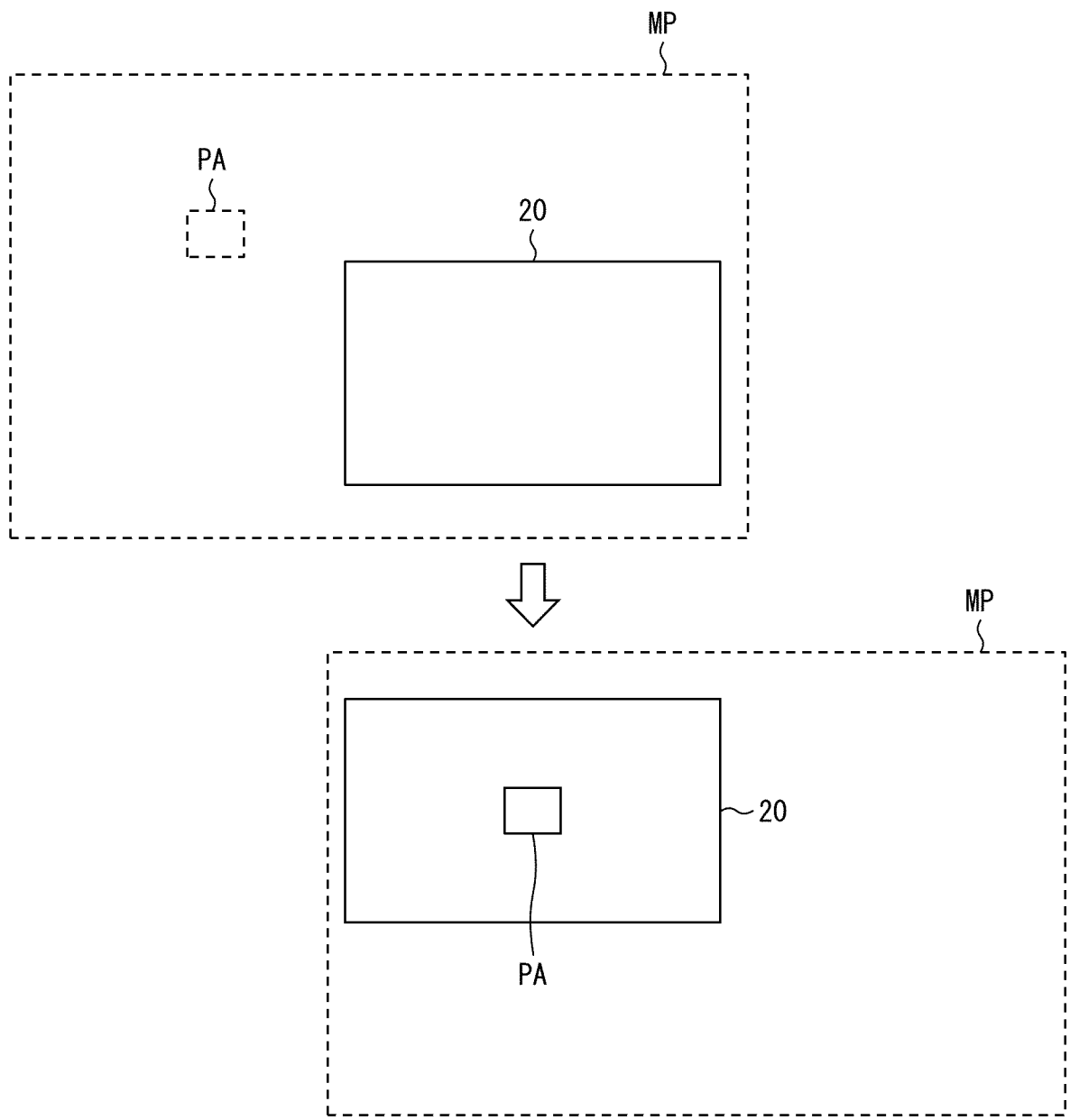
FIG. 6 schematically illustrates how a graphics screen moves.

In this case, the screen movement control section 210 may control the graphics screen to move to a location at which the component(s) as a control target(s) selected by the selecting section 170 is/are displayed on the display section 20 or on the display section 32 of the external device 5. This is specifically described with reference to FIG. 6. FIG. 6 schematically illustrates how the graphics screen moves. FIG. 6 shows display on the display section 20 as an example.

Assume that, as illustrated in the upper part of FIG. 6, the graphics screen MP contains a component PA as a control target selected by the selecting section 170 and that the display section 20 displays a part of the graphics screen MP. As illustrated in the lower part of FIG. 6, the screen movement control section 210 controls the graphics screen MP to move to a location at which the component PA is displayed on the display section 20. In so doing, the screen movement control section 210 compares the coordinates of the component PA before the movement with the coordinates of a location (e.g., center) on the display section 20 on which the component PA is to be displayed, decides the amount by which the graphics screen MP is to move, and, based on the amount of movement, controls the graphics screen to move. As such, the graphics screen MP is controlled to move so that the selected component PA is displayed on the display section 20, and therefore the user can instantly check the selected component PA.

After the graphics screen MP is moved by the screen movement control section 210, the emphasis control section 220 may control the display section 20 of the programmable display device 2 to display, in an emphasized manner, the component PA as a control target selected by the selecting section 170. Alternatively, the emphasis control section 220 may control the display section 32 of the external device 5 to display, in an emphasized manner, the component PA selected by the selecting section 170.

Examples of a method of displaying a control target in an emphasized manner include: displaying a frame enclosing the control target; displaying a frame enclosing the control target in a blinking manner; displaying an arrow indicating the control target; displaying the control target in a different color; and displaying the control target in an enlarged manner. The configuration of the emphasis control section 220 makes it possible for the user to easily identify the selected control target from among one or more control targets. The configuration also makes it possible to prevent the user from recognizing some other control target falsely as the selected control target.

Note that the screen movement control section 210 and the emphasis control section 220 may carry out processes independently of each other or may carry out processes concurrently. For example, in a case where a graphics screen MP containing many control targets is moved by the screen movement control section 210, even if a component PA selected by the selecting section 170 is displayed on the display section 20, the selected component PA is difficult to distinguish from other components. To address this, the component PA selected by the selecting section 170 is displayed in an emphasized manner by the emphasis control section 220. This makes it possible for the user to easily distinguish the component PA from the other components. Thus, the screen display control section 230 carries out at least one of (i) a screen moving process carried out by the screen movement control section 210 and (ii) an emphasizing process carried out by the emphasis control section 220.

(Value Setting Process)

The following description discusses step S9, i.e., the value setting process, which is carried out by the control section 10. The value setting process (step S9) is different from the process of text-to-speech conversion of variable (step S6) in that the selecting section 170 selects a control target(s) for which a value(s) is/are to be set, instead of selecting a variable(s) as a control target(s). The value setting process (step S9) is different from the process of text-to-speech conversion of variable (step S6) also in that the executing section 160 carries out the process of setting a value(s) as a control target(s) instead of carrying out the process of text-to-speech conversion of the value(s) of a variable(s).

In a case where a confirming operation is carried out to prevent wrong operation when, for example, the value setting process (step S9) is carried out or control target is carried out, the following arrangement may be employed: after a control target(s) is/are selected by the selecting section 170, a user can carry out the confirming operation through an input means other than voice input. Examples of such a means other than voice input include: a "Confirm" button on the touch panel 30; and a "Confirm" switch provided external to the programmable display device 2.

Embodiment 2

The following description will discuss Embodiment 2 of the present invention with reference to FIGS. 2, 5 and 7. For convenience of description, members having functions identical to those described in Embodiment 1 are assigned identical referential numerals, and their descriptions are omitted here. The following description only discusses features of Embodiment 2 different from those of Embodiment 1. FIG. 7 shows search conditions stored in a user memory 40 of a programmable display device 2 in accordance with Embodiment 2 of the present invention.

The user memory 40 stores therein settings information set on a settings screen SS2 illustrated in FIG. 7. The settings screen SS2 is different from the settings screen SS in that the entry column CF1 is replaced by an entry column CF3. A user can enter required words in the entry column CF3. Note here that, in step S4 shown in FIG. 2, for example, if the user speaks "What is the temperature of a cooler?", the words "cooler" and "temperature" are extracted as main words by the extracting section 140.

The executing section 160, instead of carrying out steps S21 to S23 shown in FIG. 5, determines whether or not the identifying section 150 has identified a search keyword(s) matching any of the main words extracted by the extracting section 140. Assume a case in which the executing section 160 has determined that the identifying section 150 has identified a search keyword matching one of the main words (YES). In this case, the word "cooler" is extracted as a main word by the extracting section 140, and the logical value of the "cooler" as a required word is a first logical value (1) indicating that the identifying section 150 has determined that the required word matches one of the main words. Therefore, the executing section 160 narrows down the list of a plurality of candidate variables to "set temperature of cooler" and "current temperature of cooler", and the process proceeds to step S25.

On the contrary, assume a case in which the identifying section 150 has not identified any search keyword(s) matching any of the main words (NO), that is, a case in which there are no required words that match the main words and in which the logical values of required words for all the variables are second logical values (0) (indicating that the identifying section 150 has determined that the required word does not match any of the main words). In this case, the executing section 160 causes the process to proceed to step S24. In this manner, the executing section 160 narrows down the list of candidate variables with use of required words.

After step S25 and step S26, in step S28, the executing section 160 selects an expression(s) associated with the required word(s) matching any of the main words, and carries out calculation to convert preferred words into numerical form using the selected expression(s). With regard to step S28, for the name "set temperature of cooler", the expression (temperature*1+set*2) evaluates to (1*1+0*2)=1. For the name "current temperature of cooler", the expression (temperature*2+current*1) evaluates to (1*2+0*1)=2. As such, the selecting section 170 selects, as a control target, the variable "current temperature of cooler", which is a variable for which its corresponding numeric value is greatest.

As has been described, according to the configurations of Embodiments 1 and 2, the selecting section 170 is configured such that: the required word(s) and preferred word(s) identified by the identifying section 150 is/are referred to; and thereby the selecting section 170 selects a control target(s) based on the following (1) and (3), based on the following (2) and (3), or based on the following (2). The following are the details of (1) to (3).

(1) Identification of each of a required word(s) based on (i) a first logical value indicating that the identifying section 150 has identified the required word and (ii) a second logical value indicating that the identifying section 150 has not identified the required word.

(2) A numeric value(s) obtained through calculation of an expression(s) for batch conversion of one or more required words set for a control target(s) into numerical form.

(3) A numeric value(s) obtained through calculation of an expression(s) for batch conversion of one or more preferred words set for a control target(s) into numerical form.

According to the above configuration, the user only needs to set a required word(s) and/or a preferred word(s) for one or more control targets and to set an expression(s). This enables the user to easily make settings for searching using a required word(s) and/or a preferred word(s) and freely change the required word(s), preferred word(s), and expression(s) as the user wishes. Furthermore, the control section 10 is capable of carrying out searching processes corresponding to various search keywords with use of a combination of a required word(s) and a preferred word(s).

Note that, according to the arrangement mainly discussed in Embodiment 2, the selecting section 170 selects a control target(s) based on the identification of a required word(s) and on the numeric value(s) obtained through calculation of an expression(s) for conversion of preferred words into numerical form. On the contrary, the selecting section 170 may select a control target(s) based on the numeric value(s) obtained through calculation of an expression(s) for conversion of required words into numerical form and on the identification of a preferred word(s). The phrase "identification of a preferred word(s)" means, similarly to the identification of a required word(s) using the logical value(s) of the required word(s) described earlier, determining whether the logical value(s) of the preferred word(s) is/are the first logical value or the second logical value.

[Software Implementation Example]

Control blocks of the programmable display device 2 (particularly, the control section 10) can be realized by a logic circuit (hardware) provided in an integrated circuit (IC chip) or the like or can be alternatively realized by software.

In the latter case, the control section 10 includes a computer that executes instructions of a program that is software realizing the foregoing functions. The computer, for example, includes at least one processor and at least one computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to or made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

The present invention is not limited to the foregoing embodiments, but can be altered by a skilled person in the art within the scope of the claims. The present invention also encompasses, in its technical scope, any embodiment derived by combining technical means disclosed in differing embodiments.

Aspects of the present invention can also be expressed as follows.

An information processing device in accordance with an aspect of the present invention includes: an identifying section configured to, by referring to one or more search keywords set for one or more control targets, identify at least one search keyword from among the one or more search keywords, the at least one search keyword matching any of one or more main words contained in input data acquired through voice input; and a selecting section configured such that: the at least one search keyword identified by the identifying section is referred to; and thereby the selecting section selects at least one control target from among the one or more control targets based on one or more numeric values obtained through calculation of one or more expressions each of which batch-converts, into numerical form, one or more of the one or more search keywords set for the one or more control targets.

According to the configuration, a control target(s) is/are selected based on the numeric value(s) obtained by conversion of a search keyword(s) into numerical form; therefore, it is possible to improve the accuracy of selection of a control target(s).

The information processing device may be arranged such that: the identifying section is configured to, in order to identify the at least one search keyword matching any of the one or more main words, refer to the one or more search keywords set by a user; and the selecting section is configured to select the at least one control target based on the one or more numeric values obtained through calculation of the one or more expressions set by the user. According to the configuration, the search keyword(s) and expression(s) can be set by the user; therefore, the user can make settings for searching using search keywords and expressions so that a control target(s) is/are appropriately selected.

The information processing device may be arranged such that: the one or more search keywords are classified into (i) one or more required words which are set for the one or more control targets and which are necessarily referred to in order to select the at least one control target and (ii) one or more preferred words which are set for the one or more control targets and which are referred to, with highest priority except the one or more required words, in order to select the at least one control target; the identifying section is configured to, by referring to the one or more required words and the one or more preferred words, identify at least one required word from among the one or more required words and identify at least one preferred word from among the one or more preferred words, the at least one required word matching any of the one or more main words, the at least one preferred word matching any of the one or more main words; and the selecting section is configured such that: the at least one required word and the at least one preferred word identified by the identifying section are referred to; and thereby the selecting section selects the at least one control target based on the following (1) and (3), based on the following (2) and (3), or based on the following (2):(1) identification of each of the one or more required words based on (i) a first logical value indicating that the identifying section has identified the required word and (ii) a second logical value indicating that the identifying section has not identified the required word; (2) one or more numeric values obtained through calculation of the one or more expressions each of which batch-converts, into numerical form, one or more of the one or more required words set for the one or more control targets; and (3) one or more numeric values obtained through calculation of the one or more expressions each of which batch-converts, into numerical form, one or more of the one or more preferred words set for the one or more control targets.

According to the configuration, the user only needs to set a required word(s) and/or a preferred word(s) for one or more control targets and to set an expression(s). This enables the user to easily make settings for searching using a required word(s) and/or a preferred word(s) and freely change the required word(s), preferred word(s), and expression(s) as the user wishes. Furthermore, the information processing device is capable of carrying out searching processes corresponding to various search keywords with use of a combination of a required word(s) and a preferred word(s).

The information processing device may further include a course-of-process display control section configured to: control a display section to display at least one of (i) course of a process in which the identifying section identifies the at least one search keyword matching any of the one or more main words and (ii) course of a process in which the selecting section selects the at least one control target based on the one or more numeric values obtained through calculation of the one or more expressions; and control the display section to display the one or more expressions during the course of the process in which the selecting section selects the at least one control target.

According to the configuration, the user can check the course of the process in which a search keyword(s) is/are identified and the course of the process in which a control target(s) is/are selected, on the display section. This allows the user to check whether settings are made so that intended actions will be carried out.

The information processing device may further include an edit section configured to edit, in accordance with user operation, the one or more search keywords and the one or more expressions which are displayed on the display section. This configuration makes it possible for the user to edit a search keyword(s) and expression(s) displayed on the display section so that a more appropriate control target(s) is/are selected.

The information processing device may further include a screen display control section configured to carry out at least one of: an emphasizing process including controlling a display section to display, in an emphasized manner, the at least one control target selected by the selecting section; and a screen moving process including, in a case where a graphics screen created by a user contains the at least one control target selected by the selecting section and where the graphics screen is higher in resolution than the display section which displays the graphics screen, moving the graphics screen to a location at which the at least one control target selected by the selecting section is displayed on the display section.

The configuration makes it possible for the user to easily check the selected control target(s). The configuration also makes it possible to prevent the user from recognizing some other control target falsely as the selected control target. Furthermore, since the graphics screen is controlled to move so that the selected control target(s) is/are displayed on the display section, the user can instantly check the selected control target(s).

The information processing device may further include a display switching control section configured to switch a graphics screen created by a user from a first screen to a second screen, the first screen being a screen in which the at least one control target selected by the selecting section is not displayed, the second screen being a screen in which the at least one control target selected by the selecting section is displayed.

According to the configuration, a graphics screen in which a selected control target(s) is/are not displayed is switched to a graphics screen in which a selected control target(s) is/are displayed. This makes it possible for the user to instantly check the selected control target(s).

A setting device in accordance with an aspect of the present invention includes: a communication section which is configured to communicate with the foregoing information processing device; and a setting section configured to, in accordance with user input operation, set the one or more search keywords and the one or more expressions for the one or more control targets. The communication section may be configured to transmit, to the information processing device, the one or more search keywords and the one or more expressions set by the setting section.

According to the configuration, the user can easily set, through the setting device, a search keyword(s) and an expression(s) for one or more targets. This makes it possible for the user to easily achieve an improvement in accuracy of selection of a control target(s).

The setting device may further include: a display; and a simulation section configured to cause the display to display at least one of: course of a process in which: the one or more search keywords set by the setting section for the one or more control targets are referred to; and thereby the at least one search keyword matching any of the one or more main words contained in user input data inputted by a user is identified in a simulation manner; and course of a process in which the at least one control target is selected in a simulation manner based on the one or more numeric values obtained through calculation of the one or more expressions each of which converts, into numerical form, one or more of the one or more search keywords set by the setting section for the one or more control targets.

According to the configuration, the user can pre-check, through the setting device, whether or not a process to select a control target(s) is carried out properly on the information processing device. Furthermore, since the identifying process and selecting process are displayed in a simulation manner on the setting device before the search keyword(s) and expression(s) are transmitted to the information processing device, the user can easily check whether or not a process to select a control target(s) is carried out properly.

REFERENCE SIGNS LIST

1 PC (setting device)
2 programmable display device (information processing device)
10 control section
12 display
13 interface section (communication section)
20 display section
32 display section
111 setting section
112 simulation section
150 identifying section
170 selecting section
180 course-of-process display control section
190 edit section
200 display switching control section
230 screen display control section

The invention claimed is:

1. An information processing device, comprising:
a processor; and
a memory configured to store computer readable instructions that, when executed by the processor, cause the information processing device to:
  identify, by referring to one or more search keywords set for one or more control targets, at least one search keyword from among the one or more search keywords, the at least one search keyword matching any of one or more main words contained in input data acquired through voice input; and
  select at least one control target from among the one or more control targets based on one or more numeric values obtained through calculation of one or more expressions each of which batch-converts, into numerical form, one or more of the one or more search keywords set for the one or more control targets, wherein
the at least one identified search keyword is referred to, and
the information processing device is further caused to:
  in order to identify the at least one search keyword matching any of the one or more main words, refer to the one or more search keywords set by a user; and
  select the at least one control target based on the one or more numeric values obtained through calculation of the one or more expressions respectively set for the one or more control targets by the user, wherein
the one or more search keywords are classified into (i) one or more required words which are set for the one or more control targets and which are necessarily referred to in order to select the at least one control target and (ii) one or more preferred words which are set for the one or more control targets and which are referred to, with highest priority except the one or more required words, in order to select the at least one control target, and the information processing device is further caused to:
identify, by referring to the one or more required words and the one or more preferred words, at least one required word from among the one or more required words and identify at least one preferred word from among the one or more preferred words, the at least one required word matching any of the one or more main words, the at least one preferred word matching any of the one or more main words; and select the at least one control target based on:
one or more numeric values obtained through calculation of the one or more expressions each of which batch-converts, into numerical form, one or more of the one or more required words set for the one or more control targets; and
one or more numeric values obtained through calculation of the one or more expressions each of which batch-converts, into numerical form, one or more of the one or more preferred words set for the one or more control targets, wherein
the at least one identified required word and the at least one identified preferred word are referred to.

2. The information processing device of claim 1, wherein the information processing device is further caused to:
control a display section to display at least one of (i) course of a process in which the at least one search keyword matching any of the one or more main words is identified and (ii) course of a process in which the at least one control target is selected based on the one or more numeric values obtained through calculation of the one or more expressions; and
control the display section to display the one or more expressions during the course of the process in which the at least one control target is selected.

3. The information processing device of claim 2, wherein the information processing device is further caused to edit, in accordance with user operation, the one or more search keywords and the one or more expressions which are displayed on the display section.

4. The information processing device of claim 1, wherein the information processing device is further caused to provide execution comprising:
an emphasizing process comprising controlling a display section to display, in an emphasized manner, the at least one selected control target; and
a screen moving process comprising, in a case where a graphics screen created by a user contains the at least one selected control target and where the graphics screen is higher in resolution than the display section which displays the graphics screen, moving the graphics screen to a location at which the at least one selected control target is displayed on the display section.

5. The information processing device of claim 1, wherein the information processing device is further caused to switch a graphics screen created by a user from a first screen to a second screen, the first screen being a screen in which the at least one selected control target is not displayed, the second screen being a screen in which the at least one selected control target is displayed.

6. The information processing device of claim 1, wherein the information processing device is configured to communicate with a communication device of a setting device, wherein the setting device comprises:
the communication device; and
processing circuitry configured to, in accordance with user input operation, set the one or more search keywords and the one or more expressions for the one or more control targets, wherein
the communication device is configured to transmit, to the information processing device, the one or more search keywords and the one or more set expressions.

7. The information processing information processing device of claim 6, wherein the setting device further comprises:
a display, wherein
the processing circuitry is configured to cause the display to display at least one of:
course of a process in which: the one or more search keywords set for the one or more control targets are referred to; and thereby the at least one search keyword matching any of the one or more main words contained in user input data inputted by a user is identified in a simulation manner; and
course of a process in which the at least one control target is selected in a simulation manner based on the one or more numeric values obtained through calculation of the one or more expressions each of which converts, into numerical form, one or more of the one or more search keywords set for the one or more control targets.

8. An information processing method, comprising:
identifying, by referring to one or more search keywords set for one or more control targets, at least one search keyword from among the one or more search keywords, the at least one search keyword matching any of one or more main words contained in input data acquired through voice input; and
selecting at least one control target from among the one or more control targets based on one or more numeric values obtained through calculation of one or more expressions each of which batch-converts, into numerical form, one or more of the one or more search keywords set for the one or more control targets, wherein
the at least one identified search keyword is referred to, and
the method further comprises:
in order to identify the at least one search keyword matching any of the one or more main words, referring to the one or more search keywords set by a user; and
selecting the at least one control target based on the one or more numeric values obtained through calculation of the one or more expressions respectively set for the one or more control targets by the user, wherein
the one or more search keywords are classified into (i) one or more required words which are set for the one or more control targets and which are necessarily referred to in order to select the at least one control target and (ii) one or more preferred words which are set for the one or more control targets and which are referred to, with highest priority except the one or more required words, in order to select the at least one control target, and the method further comprises:
identifying, by referring to the one or more required words and the one or more preferred words, at least one required word from among the one or more required words and identify at least one preferred word from among the one or more preferred words, the at least one required word matching any of the one or more main words, the at least one preferred word matching any of the one or more main words; and selecting the at least one control target based on:
one or more numeric values obtained through calculation of the one or more expressions each of which batch-converts, into numerical form, one or more of the one or more required words set for the one or more control targets; and
one or more numeric values obtained through calculation of the one or more expressions each of which batch-converts, into numerical form, one or more of the one or more preferred words set for the one or more control targets, wherein
the at least one identified required word and the at least one identified preferred word are referred to.

9. A non-transitory computer readable storage medium configured to store computer readable instructions that, when executed by a processor, cause the processor to provide execution comprising:
identifying, by referring to one or more search keywords set for one or more control targets, at least one search keyword from among the one or more search keywords, the at least one search keyword matching any of one or more main words contained in input data acquired through voice input; and
selecting at least one control target from among the one or more control targets based on one or more numeric values obtained through calculation of one or more expressions each of which batch-converts, into numerical form, one or more of the one or more search keywords set for the one or more control targets, wherein
the at least one identified search keyword is referred to, and
the processor is further caused to provide execution comprising:
in order to identify the at least one search keyword matching any of the one or more main words, referring to the one or more search keywords set by a user; and
selecting the at least one control target based on the one or more numeric values obtained through calculation of the one or more expressions respectively set for the one or more control targets by the user, wherein
the one or more search keywords are classified into (i) one or more required words which are set for the one or more control targets and which are necessarily referred to in order to select the at least one control target and (ii) one or more preferred words which are set for the one or more control targets and which are referred to, with highest priority except the one or more required words, in order to select the at least one control target, and
the processor is further caused to provide execution comprising:
identifying, by referring to the one or more required words and the one or more preferred words, at least one required word from among the one or more required words and identify at least one preferred word from among the one or more preferred words, the at least one required word matching any of the one or more main words, the at least one preferred word matching any of the one or more main words; and
selecting the at least one control target based on:
one or more numeric values obtained through calculation of the one or more expressions each of which batch-converts, into numerical form, one or more of the one or more required words set for the one or more control targets; and
one or more numeric values obtained through calculation of the one or more expressions each of which batch-converts, into numerical form, one or more of the one or more preferred words set for the one or more control targets, wherein
the at least one identified required word and the at least one identified preferred word are referred to.

10. The information processing device of claim 1, wherein the calculation of the one or more expressions, into numerical form, of the one or more of the one or more required words is performed before the calculation of the one or more expressions, into numerical form, of the one or more of the one or more preferred words.

* * * * *